Dec. 1, 1964    F. MAGINNIS    3,159,031
HYDRAULIC FULL STROKING METER
Filed June 15, 1961    3 Sheets-Sheet 1
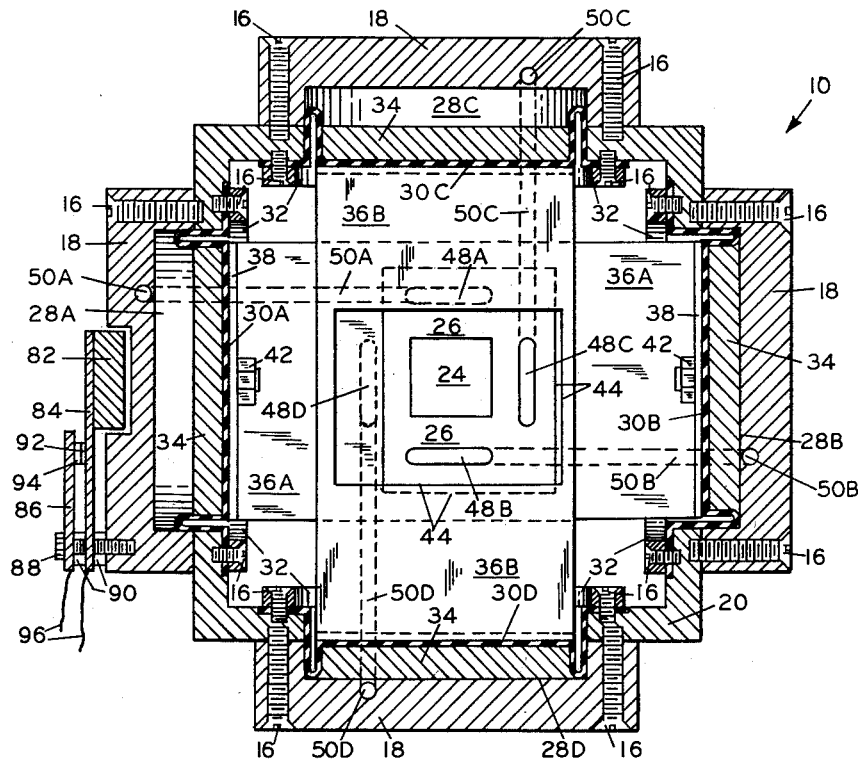
FIG. 4
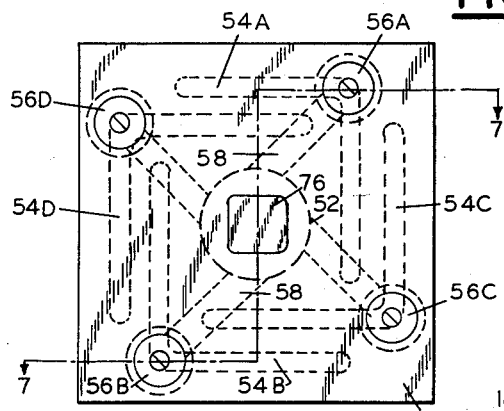
FIG. 6
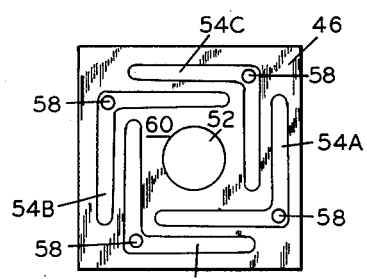
FIG. 5
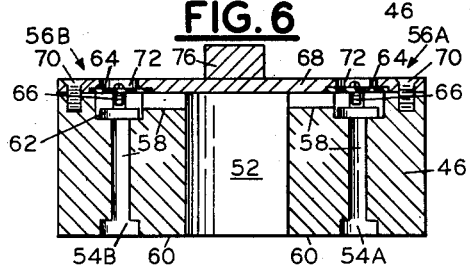
FIG. 7
FIG. 1
INVENTOR.
FRANCIS MAGINNIS
BY Head & Johnson
ATTORNEYS INVENTOR.
FRANCIS MAGINNIS
BY Head & Johnson
ATTORNEYS Dec. 1, 1964    F. MAGINNIS    3,159,031
HYDRAULIC FULL STROKING METER
Filed June 15, 1961    3 Sheets-Sheet 3

*INVENTOR.*
FRANCIS MAGINNIS
BY *Head & Johnson*
ATTORNEYS

`United States Patent Office`

3,159,031
Patented Dec. 1, 1964

3,159,031
HYDRAULIC FULL STROKING METER
Francis Maginnis, Norman, Okla., assignor to
A. O. Smith Corporation
Filed June 15, 1961, Ser. No. 117,209
6 Claims. (Cl. 73—247)

This invention relates to meters. More particularly, the invention relates to a novel type of meter having greatly improved accuracy. Still more particularly, the invention relates to a type of meter utilizing a novel hydraulic means of achieving full positive displacement strokes whereby the accuracy of the meter is assured, and in a manner whereby the accuracy of the meter is maintained over a greatly extended length of time.

One of the problems in obtaining accurate meter readings, particularly in the type of meter using positive displacement chambers, is that of making sure that the chambers of the meter receives and discharges exactly the same amount of fluid on each stroke of the meter. Designing a meter to produce accurate readings at a given flow rate is not difficult, but an onerous problem exists in providing a meter which will measure accurately over a wide range of flow rates. A still more difficult task exists in designing meters which do not lose calibrated accuracy as the components of the meter wears.

Others working to provide accurate positive displacement meters have provided meters having complicated linkages to insure proper valving to open and close valves leading to the meter measuring chambers, as well as linkages between the cylinders of the meters. Such linkages result in points wherein wear can occur. When the linkage mechanisms wear, they become a source whereby error is introduced into the meter. In addition, extensive linkages provide increased possibility of meter failure.

In this invention full stroking is achieved through a hydraulic process in distinction to the normally used mechanical process. Force is utilized in a unique manner in this invention to insure full stroking of a positive displacement meter in such a way that wear of the components of the meter will not effect the accuracy of the meter.

It is therefore an object of this invention to provide a meter having greatly improved accuracy wherein the accuracy is insured without the use of any type of mechanical linkages.

Another object of this invention is to provide a positive displacement meter which will not diminish substantially in accuracy as wear occurs in the meter.

Another object of this invention is to provide a positive displacement meter utilizing cross-scotch yokes actuating an inverted cup-slide and wherein the inverted cup-slide is forced through hydraulic processes to follow a predetermined path of travel which is not materially varied by the flow rate of fluid through the meter.

Another object of this invention is to provide a positive displacement meter which will be simple and inexpensive to manufacture and which will have highly improved accuracy compared to existing types of meters.

These and other objects and a better understanding of the invention may be had by referring to the following description and claims taken in conjunction with the attached drawings in which:

FIGURE 1 is an isometric external view of the meter of this invention.

FIGURE 4 is a cross-sectional view taken along the line 4—4 of FIGURE 2.

FIGURE 5 is a bottom view of the inverted cup-slide member.

FIGURE 6 is a top view of one arrangement of the inverted cup-slide member.

FIGURE 7 is a cross-sectional view of the inverted cup-slide member taken along the line 7—7 of FIGURE 6.

Figure 2:
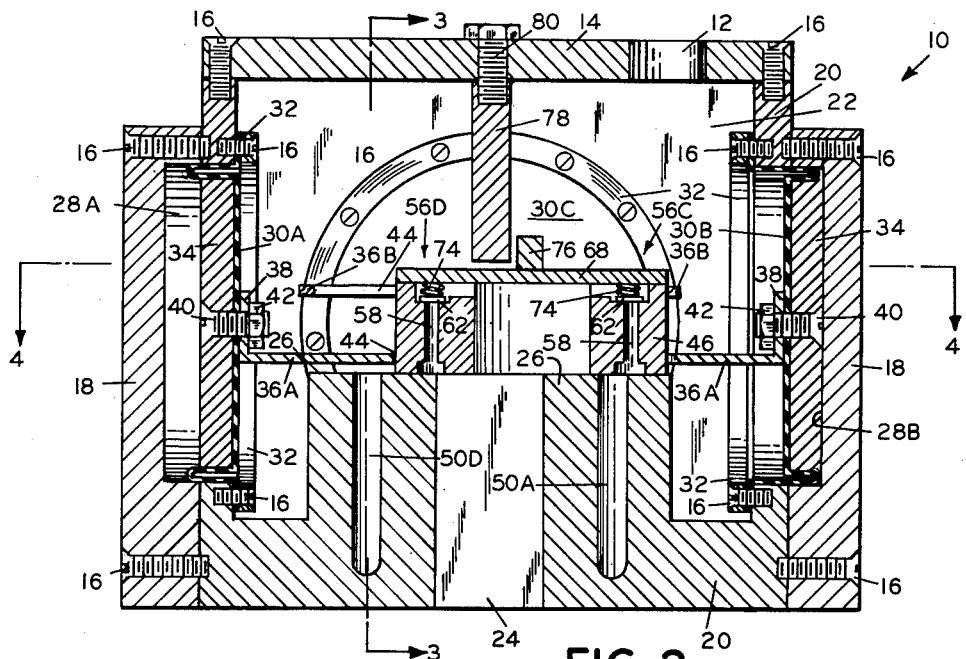
FIGURE 2 is a cross-sectional view taken along the line 2—2 of FIGURE 1.

Referring now to the drawings and first to FIGURE 1, the meter of this invention is generally indicated by the numeral 10. Although the geometrical configuration of the meter may include a multitude of different arrangements, to demonstrate the simplicity of the meter it is shown substantially as a cube. Fluid enters the meter through inlet port 12 in the top plate 14 which is secured in position by screws 16. Cylinder blocks 18 are supported to the meter body 20 by screws 16.

Referring to FIGURE 2, the internal construction of the meter is shown. Meter body 20 is of a substantially cubical dimension, but has the interior forming a fluid chamber 22. Fluid enters through inlet port 12 and completely fills the fluid chamber 22. An outlet port 24 extending through body 20 discharges fluid from the meter. In order to pass through the meter, fluid enters inlet port 12 to fill fluid chamber 22 and must pass out through outlet port 24. Body 20 is provided with a flat surface which is substantially parallel to top plate 14 and perpendicular to cylinder blocks 18 and is termed a port plate 26. Outlet port 24 communicates with port plate 26.

Radially positioned around the body 20 are four cylinder blocks 18 in which are formed cylinder chambers 28A through 28D. Actuating within the four cylinder chambers 28 are four folded diaphragms 30A through 30D. The diaphragms 30 are an example of a type of positive displacement chamber which may be utilized according to the principles of this invention. Folded diaphragms 30 may be replaced with flat diaphragms, pistons or any other expansionable chamber members which provide a positive displacement chamber means within cylinder blocks 18. External diameters of the folded diaphragms 30 are supported to body 20 by retaining rings 32 held by screws 16. A backing plate 34 supports each diaphragm 30 to insure an equal displacement each time cylinder chambers 28 are either filled or emptied.

Extending from opposing diaphragm 30A to diaphragm 30B is a yoke member 36A and extending from opposing diaphragm 30C to diaphragm 30D is yoke member 36B. The configurations of the yokes 36A and 36B are best shown in FIGURE 4. Each yoke 36A and 36B is a flat member having angular end portions 38 which engage diaphragms 30 and are supported to backing plates 34 by screws 40 and nuts 42. Each of the yokes 36 includes a rectangular opening 44. Yokes 36A and 36B are positioned in overlapping parallel planes so that by the actuation of diaphragms 30 the yokes reciprocate parallel to each other but in directions which are at right angles to each other. The overlapping openings 44 in yokes 36A and 36B define a square opening which receives an inverted cup-slide member 46 (see FIGURES 2 and 3). In FIGURE 4 the inverted cup-slide 46 is not shown to more fully disclose the configuration of port plate 26. Inverted cup-slide 46 slides upon port plate 26 by actuation of the yoke members 36A and 36B which are in turn positioned by diaphragms 30A through 30D.

Referring particularly to FIGURE 4, the port plate 26 is provided, in addition to outlet port 24, with four valving ports 48A through 48D. Valving port 48A is connected by a fluid passage 50A to cylinder chamber 28A. In like manner, valving port 48B is connected by fluid passage 50B to cylinder chamber 28B. Similarly, valving ports 48C and 48D are connected to cylinder chambers 28C and 28D by fluid passages 50C and 50D respectively. Fluid passages 50A through 50D are formed in body 20 and extend through cylinder blocks 18 to communicate with cylinder chambers 28A through 28D. In this manner, fluid entering or leaving fluid chambers 28A through 28D is controlled by the inverted cup-slide 46 operating on port plate 26 to open and close valving ports 48A through 48D.

Figure 3:
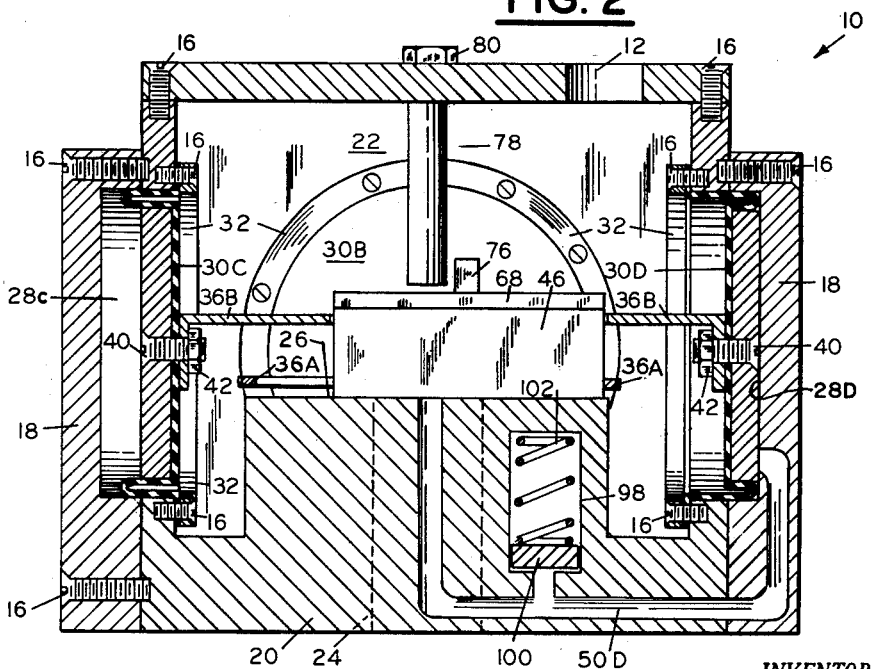
FIGURE 3 is a cross-sectional view taken along the line 3—3 of FIGURE 2.

Referring to FIGURES 2 and 3, it can be seen that fluid entering inlet port 12, in order to pass out through outlet port 24, must first enter one of the cylinder chambers 28A through 28D and subsequently leave the cylinder chamber and flow through one of the fluid passages 50A through 50D and within inverted cup-slide 46 to outlet port 24. Thus, the inverted cup-slide 46 controls the filling and emptying of cylinder chambers 28A through 28D.

FIGURES 5 through 7 disclose the arrangement of the inverted cup-slide member 46. FIGURE 5 is a bottom view of the inverted cup-slide member 46 and discloses five port openings. In the center is a main port opening 52 and positioned around the main port opening 52 are four L-shaped inverted cup-slide ports 54A through 54D. FIGURE 6, a top view of the inverted cup-slide 46, discloses that each of the inverted cup-slide ports 54A through 54D communicates through an inverted cup-slide valve 56A through 56D to the main port opening 52 by means of fluid passages 58. FIGURE 7 is a cross-sectional view of the inverted cup-slide 46. The bottom surface 60, which engages port plate 26, is a very flat surface so as to provide a complete sealing engagement with port plate 26. The only accurate manufacturing requirements of the meter, according to this invention, is the sealing and slideable engagement of the bottom surface 60 of inverted cup-slide 46 on port plate 26.

Inverted cup-slide valves 56A through 56D may be arranged in a multitude of different configurations. FIGURE 7 discloses one arrangement which obviates the requirement of a spring or other biasing member. A valve flapper 62 connects to a small diaphragm 64 by a valve actuating rod 66. In this arrangement inverted cup-slide 46 is equipped with an upper plate 68 which is supported to the body of the inverted cup-slide 46 with screws 70. Openings 72 immediately above the small diaphragm 64 provide a means whereby the pressure of fluid in fluid chamber 22 is communicated to the small diaphragm 64 and by rods 66 to valve flapper 62. Thus, with meter 10 subjected to a fluid pressure, the pressure drop across the meter means that a fluid pressure will always exist in fluid chamber 22 and thereby apply pressure to maintain flapper 62 closed against passage of fluid through inverted cup-slide ports 54A through 54D.

An alternate arrangement of the inverted cup-slide valves 56A through 56D is shown in FIGURE 2. In this arrangement the upper plate 68 of inverted cup-slide 46 is not provided with openings and the flappers 62 are maintained in compressive closure of fluid passages 58 by springs 74.

A positioning element 76 is affixed to the center of upper plate 68 of inverted cup-slide 46 and extends perpendicularly therefrom. A positioning guide 78 extends from the top plate 14 of meter 10 downwardly and terminates at the proximity of upper plate 68 of inverted cup-slide 46. Positioning guide 78 may be supported to top plate 14, such as by a stud 80. Positioning guide 78 is cylindrical in configuration whereas positioning element 76 is substantially rectangular in cross-section having rounded corners as shown in FIGURE 6. The functional relationship between positioning guide 78 and positioning element 76 will be described subsequently.

An alternate hydraulic full stroking arrangement is shown in FIGURE 3. Storage cavities 98 (only one of which is shown) are formed in body portion 20 communicating with each of the fluid passages 50. A piston 100 is slideably positioned in fluid cavity 98 and is biased by spring 102 to resist the flow of fluid from fluid passage 50D into fluid cavity 98. The application of this embodiment will be described subsequently.

Operation

To flow through meter 10, fluid first enters inlet port 12 to fill fluid chamber 22. The fluid then must flow out of the meter through outlet port 24. As can be seen in FIGURE 4, when inverted cup-slide 46 is positioned in the square opening formed by the overlapping yokes 36A and 36B, the inverted cup-slide will at all times completely cover the outlet port 24. Thus, fluid must eventually flow through the port openings 54 in the inverted cup-slide before fluid can reach the outlet port 24. Fluid can flow into the inverted cup-slide ports 54 only from valving ports 48A through 48D which in turn means that fluid can flow into inverted cup-slide ports 54 and thus out of the meter through outlet port 24 only by first entering cylinder chambers 28A through 28D and then being discharged from the chambers.

If the inverted cup-slide is positioned on port plate 26 in the overlapping openings 44 of yokes 36A and 36B as shown in FIGURE 4, valving ports 48B and 48C will be covered by the inverted cup-slide and valving ports 48A and 48D will be exposed to the pressure of fluid in fluid chamber 22. Fluid would then tend to flow from fluid chamber 22 into valving ports 48A and 48D through fluid passages 50A and 50D to cylinder chambers 28A and 28D. Since diaphragm 30A is already moved to its maximum distance away from cylinder blocks 18, as indicated by backing plate 34 having engagement with cylinder chamber 28B, so additional fluid cannot flow into valving port 48A. This means that fluid flow can now occur only by fluid entering valving port 48D to begin to fill cylinder chamber 28D. This will move yoke 36B towards the top of the page and therefore the inverted cup-slide (not shown in FIGURE 4) with it.

By the actuation of the inverted cup-slide, valving ports 48A through 48D are sequentially opened to receive fluid flow into a cylinder chamber 28 and simultaneously the companion valving port 48 is opened to permit fluid to flow within the inverted cup-slide out of the companion cylinder chamber 28 through the inverted cup-slide and into outlet port 24 to pass out of the meter. An important element of this invention is a means whereby hydraulic full stroking of the meter is accomplished in a manner such that the inverted cup-slide 46 will also travel in its maximum direction as it moves in a circuitous path on port plate 26. The manner in which this is accomplished is shown diagrammatically in FIGURES 8 through 11.

FIGURES 8 through 11 are diagrammatic representations of the operation of the meter of this device. The figures are shown as taken above looking down upon the port plate 26 of the meter 10, the port plate being itself not shown except in the manner that the entire area over which the inverted cup-slide 46 travels constitutes the port plate. The inverted cup-slide is shown as a section parallel to the port plate near the bottom of the inverted cup-slide. Inverted cup-slide valves 56A through 56D are shown diagrammatically communicating between inverted cup slide ports 54 and inverted cup-slide main port opening 52.

Figure 8:
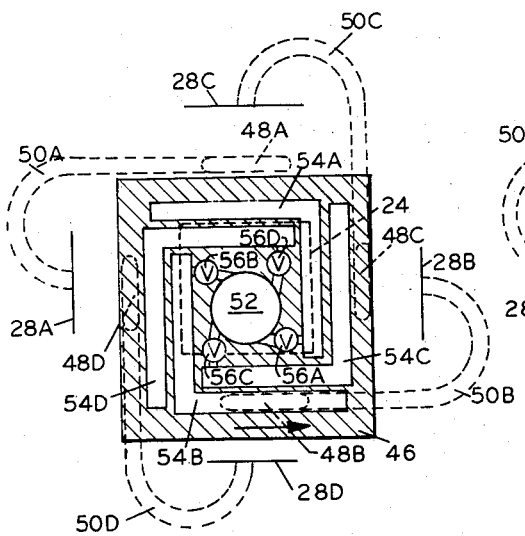
FIGURES 8 through 11 are diagrammatic views of the action of the inverted cup-slide member through a portion of a cycle of the meter operation.

With the valve in the position as shown in FIGURE 8, only valving port 48A is exposed to the fluid pressure within fluid chamber 22. Fluid will therefore be forced into valving port 48A and through fluid passage 50A to cylinder chamber 28A. This will move yoke 36A (not shown in FIGURES 8 through 11) to the right, moving inverted cup-slide 46 to the right as indicated by the arrow. As inverted cup-slide 46 moves to the right, the cylinder chamber 28B will diminish in volume forcing fluid through fluid passage 50B, out of valving port 48B, and into inverted cup-slide port 54B. It will be noted that a portion of inverted cup-slide port 54B communicates with outlet port 24 so that fluid which had formerly filled cylinder chamber 28B now flows into outlet port 24 and discharges exterior the meter. With the meter in the position shown in FIGURE 8, fluid is flowing into the meter by passing into cylinder chamber 28A filling it and fluid is discharging from the meter by emptying cylinder chamber 28B.

Figure 9:
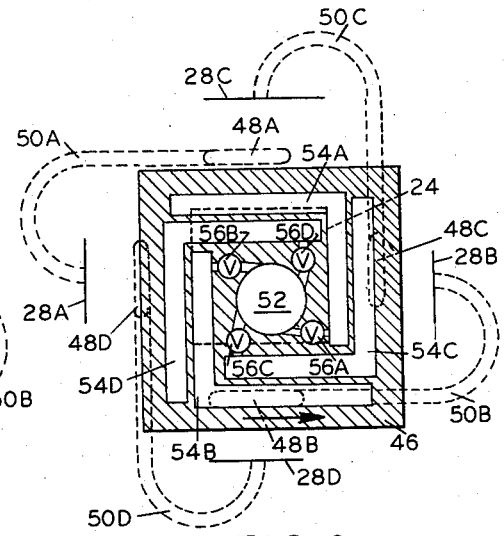

Inverted cup-slide 46 will continue to move in the direction of the arrow and will reach the position shown in FIGURE 9. In FIGURE 9 valving port 48A is still open to receive fluid into cylinder chamber 28A and valving port 48B is still in communication with the outlet port 24 so inverted cup-slide 46 will continue to move to the right in the direction of the arrow. However, it will be noted that at this point valving port 48D is now partially uncovered by inverted cup-slide 46, at the same time valving port 48C is in communication with inverted cup-slide port 54C. Keeping in mind it is the objective of the novel principles of this invention to provide full stroking of the meter irrelevant of the flow rate, the objective of this point in the meter function is to maintain the movement of inverted cup-slide 46 in its original direction to the right and to prevent it from starting to move at a right angular direction before the stroke to the right is complete.

Only by completely filling and completely emptying the cylinder chambers 28 on each stroke of the meter can absolute accuracy of the meter be maintained. At the point reached in FIGURE 9, if fluid now flows into valving port 48D, then the inverted cup-slide 46 would tend to move towards the top of the page. This would mean that the inverted cup-slide would tend to cover valving port 48A before cylinder chamber 28A had completely filled. The effect would be the shortening of the total stroke of the inverted cup-slide. It is thus the object of the invention to prevent the upward movement of the inverted cup-slide 46 until the movement to the right is complete.

This is accomplished hydraulically, according to the principles of this invention, by the novel configuration of the inverted cup-slide ports 54, the provision of valves 56, the provision of main port opening 52 in inverted cup-slide 46, and the provision of outlet port 24 in port plate 26. The novel arrangement of these elements of port plate 26 and inverted cup-slide 46 provides a means whereby the meter is assured of complete stroking by the application of hydraulic control.

It will be noted that in the position of FIGURE 9, although valving port 48D is partially uncovered by the inverted cup-slide 46 and therefore exposed to the fluid pressure within fluid chamber 22, fluid will not enter valving port 48D due to the restriction imposed upon flow out of cylinder chamber 28C by valve 56C. It can be seen that fluid cannot enter cylinder chamber 28D unless fluid is permitted to escape from cylinder chamber 28C, since the diaphragms 30C and 30D of cylinder chambers 28C and 28D are interdependent in their movement by the provision of yoke 36B. In order for fluid to flow out of cylinder chamber 28C, it must flow through fluid passage 50C, out of valving port 48C, into inverted cup-slide port 54C and from inverted cup-slide port 54C to outlet port 24 which communicates with the exterior of the meter. The only way fluid can flow from cylinder chamber 28C to outlet port 24 in the attitude of the meter in FIGURE 9 is by flowing through inverted cup-slide valve 56C to main port opening 52 in the inverted cup-slide which is always in communication with the outlet port 24 of port plate 26. Fluid flowing in this path must pass through inverted cup-slide valve 56C which is restricted or biased closed. In any event, more fluid pressure will be required to force fluid into valving port 48D than is required to force fluid into valving port 48A since flow restriction must be overcome in the flow of fluid out of cylinder chamber 28B as inverted cup-slide port 54B is in direct communication with the outlet port 24. Fluid will always flow through the path of least resistance and in the attitude of the meter of FIGURE 9, the path of least resistance will continue to move the inverted cup-slide to the right, and even though port 48D is open, the flow resistance imposed by inverted cup-slide valve 56C will prevent the meter from moving towards the top of the page. This insures the complete movement of the inverted cup-slide 46 to the right.

When cylinder chamber 28A is completely filled and chamber 28B completely emptied, no further flow of fluid can occur into valving port 48A. This is the attitude of the meter shown in FIGURE 10. At this position, since fluid can no longer flow into valving port 48A, the only place it can flow is into valving port 48D. As previously mentioned, fluid flow into this port requires fluid flow out of valving port 48C which can be accomplished only by overcoming the flow resistance of inverted cup-slide valve 56C. At this point in the flow of fluid through meter 10, there will be a momentary build up of hydraulic force within fluid chamber 22 sufficient to overcome the flow resistance of inverted cup-slide valve 56C. As this resistance is overcome, fluid can now flow from cylinder chamber 28C, through fluid passage 50C, out of valving port 48C, into inverted cup-slide port 54C, and through inverted cup-slide valve 56C into main port opening 52 which communicates with outlet port 24. With fluid flowing through inverted cup-slide valve 56C, cylinder chamber 28C will begin to empty and cylinder chamber 28D will begin to fill, moving yoke 36B and therefore inverted cup-slide 46 towards the top of the page. When the position is attained as shown in FIGURE 11, a portion of the L-shaped inverted cup-slide port 54C will then communicate directly with the outlet port 24 inport plate 26 and therefore fluid may freely flow out of cylinder chamber 28C through inverted cup-slide port 54C and out of the meter through outlet port 24. Thus, inverted cup-slide valve 56C will close and fluid flow into inverted cup-slide port 54C will now flow directly into outlet port 24.

The meter will continue its operation to move inverted cup-slide 46 upward, and although valving port 48B will be next uncovered, which would tend to move the inverted cup-slide to the left, the restriction of flow imposed by inverted cup-slide valve 56A will prevent movement in this direction until the inverted cup-slide comes to the end of its forward movement and hydraulic pressure is accumulated sufficient to overcome the resistance of inverted cup-slide valve 56A.

In sequence, the steps of the process are repeated so that on a complete cycle of the meter, inverted cup-slide 46 makes a rectangular path on port plate 26. The path is completely rectangular in that each time the inverted cup-slide starts to move a given direction, the characteristics of the design of the meter are such that it will continue to move in this direction until reaching the end and the momentary build up of increased hydraulic fluid pressure is required in fluid chamber 22 before the meter will start to move in a right angular direction.

It should be noted that only a relatively small percent of the fluid which flows through the meter will flow through inverted cup-slide valves 56. This is due to the fact that the inverted cup-slide valves 56 open only a short length of time sufficient to move the inverted cup-slide 46 so that inverted cup-slide ports 54 communicate with outlet port 24. When communication is established between the inverted cup-slide ports 54 and outlet port 24, fluid freely flows through this path and the requirement of fluid flow through hte inverted cup-slide valves 56 is eliminated.

The positioning element 76 (see FIGURE 3) affixed to the upper plate 68 of inverted cup-slide 46 engages positioning guide 78 to insure the positioning of the inverted cup-slide 46 away from the center of the port plate 26.

The interrelationship between positioning element 76 and positioning guide 78 is not required in order to insure full stroking and any wear of these elements will not in any way effect the accuracy of the meter. The provision for these elements is made only to prevent the inverted cup-slide 46 from accidently getting into exact position over the port plate 26 so as to cover all of the valving ports 48 at one time. If such occurred, the meter could not start to function. Once the meter starts to function, the hydraulic full stroking method of the device insures accurate rectangular movement of the inverted cup-slide 46 to make certain of the complete filling and emptying of the cylinder chambers 28 except for some spurious physical effect, such as tilting of the valve and so forth, which might mis-position the inverted cup-slide when no fluid is flowing through the meter.

As has been previously mentioned, the inverted cup-slide valves 56 may be designed according to that of FIGURE 7 or by the use of springs as shown in FIGURE 2. Other means of maintaining biasing force on the valve flappers 62 will suggest themselves.

According to the principle of FIGURE 7, the pressure of the fluid drop across the meter acts on the area of diaphragms 64 to close flappers 62 against fluid passages 58. With fluid flow through the meter there will always be a hydraulic pressure drop on the two sides of the diaphragms 64 so that they will remain closed except when the inverted cup-slide reaches the end of a stroke and a momentary hydraulic build up occurs equalizing the pressures and allowing the inverted cup-slide valves 56 to open momentarily to start the movement of the inverted cup-slide.

Various means may be utilized to detect the number of cycles of the meter which will, of course, indicate the volume of flow through the meter. One example is indicated in FIGURE 4 wherein a magnet 82 is supported on a flexible arm 84. A stationary arm 86 extends parallel to the flexible arm 84. The assembly is supported to the meter 10 by a stud 88. Insulating elements 90 insulate the arms 84 and 86 from each other. A contact point 92 is affixed to flexible arm 84 and likewise a contact point 94 is affixed to stationary arm 86. Conductors 96 having continuity with stationary arm 86 and flexible arm 84 provide means whereby the electrical continuity of contact points 92 and 94 is detected. On each stroke of meter 10, when yoke 36A is moved to close cylinder chamber 28A, the backing plate 34, of a paramagnetic material such as light steel, moves to the proximity of magnet 82. Magnet 82 is thereby attracted to backing plate 34, flexing flexible arm 84 so that contact point 92 separates from contact point 94 breaking the circuit of conductors 96. In this arrangement, the cylinder block 18 of cylinder chamber 28A will be of a non-magnetic material, such as aluminum or plastic. Each time the meter 10 flows through one stroke, which fills and empties each of the four cylinder chambers 28 in sequence and thereby indicates the passage of a given quantity of fluid through the meter, the contact points 92 and 94 are broken. Other means of detecting the cyclic actuation of the yokes 36 and inverted cup-slide 46 will suggest themselves.

The basic principle of this invention, may be briefly described as the interposition of flow restriction at the beginning of the reciprocal movement of a pair of pistons in a meter to achieve full stroke. An example of the application of the invention has been described wherein inverted cup-slide valves 56 are incorporated in the inverted cup-slide 46. An alternate means of utilizing the principles of the invention is shown in FIGURE 3. In this embodiment flow restriction occurring at the beginning of the movement of inverted cup-slide 46 in a new direction is accomplished by storing liquid in storage cavity 98, the storage being accomplished only by fluid pressure sufficient to overcome tension of spring 102, as piston 100 is displaced.

Figure 10:
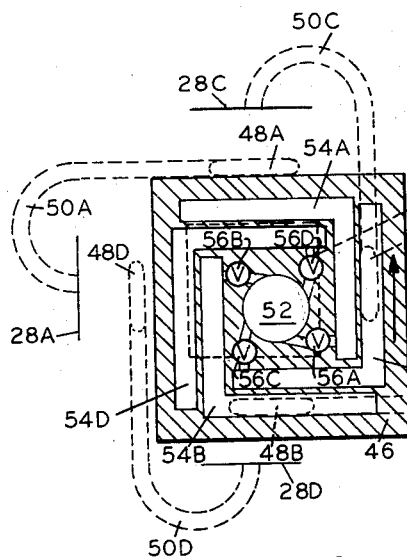
Figure 11:
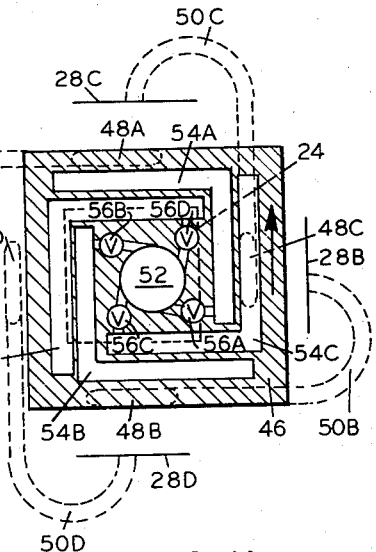

As an example of the application of this embodiment, assume that a storage cavity 98 is provided having communication with fluid passages 50A through 50D and that the inverted cup-side valves 56 in FIGURE 10 are eliminated. At the attitude of the meter in FIGURE 10, inverted cup-slide 46 has terminated its movement to the right and has momentarily stopped, causing fluid pressure to build up in the meter. Fluid may freely enter valving port 48D to fill cylinder chamber 28D, except that cylinder chamber 28C cannot exhaust as there is no communication of valving port 48C with outlet port 24. As fluid pressure builds up fluid would be able to flow from fluid passage 50C into a storage cavity 98 (not shown in FIGURE 10), discharging a portion of the fluid in cylinder chamber 28C. This permits the inverted cup-slide 46 to start moving in the direction of the arrow. As the inverted cup-slide 46 moves the storage cavity 98 will fill, moving piston 100 and compressing spring 102. When the attitude of FIGURE 11 is reached, inverted cup-slide port 54C has established communication with outlet port 24, allowing fluid freely to discharge from cylinder chamber 28C until it is fully discharged at which time inverted cup-slide 46 will have moved in its furthermost upward direction. When communication is made between inverted cup-slide port 54C and outlet port 24, the fluid pressure in the meter will drop, releasing pressure on the fluid in the storage cavity 98 so that the pressure of spring 102 will move piston 100 to empty the fluid. The fluid discharged from storage cavity 98 will flow with fluid discharging from cylinder chamber 28C to outlet port 24.

Storage cavity 98 may be termed a biased storage means in communication with cylinder chamber 28 and may be arranged in many ways. Compressible gas may replace spring 102 to bias piston 100 downward. An expansionable bag of compressible gas may be positioned in storage cavity 98 to replace spring 102 and piston 100. A fluid stand pipe communicating with fluid passage 50D could replace storage cavity 98. Flow restriction and flow restriction means, as utilized in this description, includes biased flow storage as a means of achieving hydraulic full stroking of a meter.

In this invention hydraulic full stroking is accomplished by placing the inverted cup-slide valves 56 in the inverted cup-slide 46. It can be seen that the inverted cup-slide valves 56 may be positioned elsewhere in the hydraulic system of the meter in such a manner that flow restriction is interposed during the initial movement of the inverted cup-slide in a new direction to assure complete movement in the original direction.

In this description the term "full stroking" means the filling and emptying of the cylinder chambers the full predetermined amount on each cycle or stroke of the meter. Completely filling and completely emptying of the cylinder chambers means the filling and emptying of cylinder chambers by the full predetermined amount of fluid and is not intended to mean that the cylinder chambers are filled to their maximum physical capacity nor emptied of all the fluid which may be contained therein.

Although this invention has been described with a certain degree of particularity, it manifests that many changes may be made in the details of construction and the arrangement of components without departing from the spirit and scope of this disclosure.

What is claimed:

1. A fluid meter, comprising, in combination; a body member having a fluid cavity therein adaptable to receive fluid into said meter; a first and a second pair of radially disposed expansionable chambers supported in said body member; expansionable chamber members actuatable within said expansionable chambers whereby the volume of each said expansionable chambers may be varied; a first yoke member extending from one of said expansionable chamber members of said first pair to the other of said expansionable chamber members of said first pair;

a second yoke member extending from one of said expansionable chamber members of said second pair to the other of said expansionable chamber members of said second pair, said yoke members disposed to reciprocate by action of said pairs of expansionable chamber members perpendicularly to each other in parallel planes and in proximity to each other, and each of said yoke members having a rectangular opening therein, the opening in said first yoke member overlapping said opening in said second yoke member; a port plate positioned in a plane parallel to said yokes and in proximity thereto, said port plate having a discharge opening therein communicating with the exterior of said body member and four valving ports therein, said body member having a fluid passage from each of said expansionable chambers to one of said valving ports in said port plate; an inverted cup-slide member adaptable to slideably engage on the bottom surface thereof said port plate, said inverted cup-slide member extending through said overlapping openings in said yoke members and adaptable thereby to be movably positioned on said port plate by movement of said yoke members, said inverted cup-slide having four ports formed in the bottom surface thereof and said inverted cup-slide having a main port opening in the bottom surface thereof and fluid passages providing communication between each of said inverted cup-slide ports and said main port, said inverted cup-slide ports and said main port openings in said inverted cup-slide adaptable to permit fluid to flow from said valving ports into said discharge opening in said port plate according to the position of said inverting cup-slide member; means of full reciprocal stroking said yoke members, said means comprising flow restriction means interposed in each of said fluid passages between each of said inverted cup-slide ports and said main port whereby fluid flow through said meter on the first portion of the reciprocal movement of each of said yoke members extracts more energy from the fluid stream than is required on the last portion of the reciprocal movement of each of said yoke members.

2. A meter according to claim 1 wherein said inverted cup-slide has openings in the upper surface thereof adjacent said fluid passages and wherein each of said biased valve means comprises; a diaphragm sealing one of said openings; a flapper closing said fluid passage associated therewith; and means connecting said diaphragm and said fluid passage whereby fluid pressure on said diaphragm forces said flapper in sealing closure of said passage.

3. A fluid meter having a body member; a first and a second pair of expansionable chambers; a yoke member connecting each pair of expansionable chambers, said yoke members being positioned with the axes thereof in an overlapping angular relationship and having overlapping openings therein; a port plate adjacent to said overlapping yoke members, said port plate having an outlet port therein communicating with the exterior of said meter; an inverted cup-slide member received by said overlapping openings in said yoke members in slidable engagement with said port plate, said body member, said port plate and said inverted cup-slide having fluid passages therein whereby fluid may flow sequentially into and out of said expansionable chambers; hydraulic means for assuring full stroking of said expansionable chambers, said hydraulic means comprising flow restriction means establishing biased fluid storage means in communication with each of said expansionable chambers whereby flow of fluid through said expansionable chambers on the first portion of the reciprocal movement of said pairs of expansionable chambers is restricted.

4. A fluid meter, comprising, in combination: a body member having a fluid cavity therein adaptable to receive fluid into said meter; a first and a second pair of radially disposed expansionable chambers supported to said body member; expansionable chamber members actuatable within said expansionable chambers whereby the volume of each of said expansionable chambers may be varied; a first yoke member extending from one of said expansionable chamber members of said first pair to the other of said expansionable chamber members of said first pair; a second yoke member extending from one of said expansionable chamber members of said second pair to the other of said expansionable chamber members of said second pair, said yoke members disposed to reciprocate by action of said pairs of expansionable chamber members in parallel planes and in proximity to each other, the axes of the yoke members being disposed for reciprocation at substantially right angles with respect to each other and each of said yoke members having an opening therein, the opening in said first yoke member overlapping said opening in said second yoke member; a port plate positioned in a plane parallel to said yokes and in proximity thereto, said port plate having a discharge opening therein communicating with the exterior of said body member and four valving ports therein, said body member having a fluid passage from each of said expansionable chambers to one of said valving ports in said port plate; an inverted cup-slide member adaptable to slidably engage on the bottom surface thereof said port plate, said inverted cup-slide member extending through said overlapping openings in said yoke members and adaptable thereby to be movably positioned on said port plate by movement of said yoke members, said inverted cup-slide having passage means disposed in communication with the discharge port of said port plate and adapted to sequentially communicate with said valving ports to provide a path of fluid flow from each of said expansionable chambers in sequence into said discharge opening in said port plate; means for insuring the full reciprocal stroking movement of said yoke members, said means comprising flow restriction means in each of said paths of fluid flow from said expansionable chambers whereby fluid flow is restricted during the first portion of the reciprocal movement of each of said yoke members.

5. A meter according to claim 4 wherein the passage means of said inverted cup-slide ports formed in the bottom surface of said inverted cup-slide have L-shaped configurations adjacent the bottom surface thereof and wherein a portion of said L-shaped inverted cup-slide passage portion is adapted to communicate with one of said valving ports in said port plate when said inverted cup-slide is in proper position and wherein the other portion of said L-shaped inverted cup-slide passage portion is adaptable to communicate with said outlet port in said port plate when said inverted cup-slide is in proper position.

6. A meter according to claim 4 having flow restriction means interposed in each of said fluid passages between each of said inverted cup-slide ports and said main port comprising biased valve means.

References Cited in the file of this patent
UNITED STATES PATENTS

| | | |
|---|---|---|
| 382,145 | Dick | May 1, 1888 |
| 502,247 | Chappell | July 25, 1893 |
| 2,356,273 | Risser | Aug. 22, 1944 |
| 3,001,400 | Graaf | Sept. 26, 1961 |